(12) United States Patent
Zama

(10) Patent No.: US 6,319,628 B1
(45) Date of Patent: Nov. 20, 2001

(54) SECONDARY BATTERY WITH PLURAL ELECTRODE TERMINALS CONNECTED THROUGH ONE COLLECTING TERMINAL AND MANUFACTURING METHOD THEREOF

(75) Inventor: Kouichi Zama, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/670,476

(22) Filed: Sep. 26, 2000

(30) Foreign Application Priority Data

Sep. 29, 1999 (JP) .................................. 11-276758

(51) Int. Cl.[7] ................................................ H01M 2/30
(52) U.S. Cl. ............................................. 429/65; 429/178
(58) Field of Search ............................. 429/65, 122, 168, 429/170, 178, 181

(56) References Cited

U.S. PATENT DOCUMENTS 4,810,598 * 3/1989 Levy et al. ............................... 429/59
5,789,108 * 7/1998 Sprengel et al. ....................... 429/178
6,004,692 * 12/1999 Muffeletto et al. .................... 429/163
6,071,638 * 6/2000 Fradin ...................................... 429/94
6,106,975 * 8/2000 Watanabe et al. .................... 429/211

* cited by examiner

Primary Examiner—Gabrielle Brouillette
Assistant Examiner—Monique Wills
(74) Attorney, Agent, or Firm—Hayes, Soloway, Hennessey, Grossman & Hage P.C.

(57) ABSTRACT

A secondary battery according to the present invention includes a case for accommodating an electrode element therein and a conductive lid element for closing an open end of the case. A plurality of electrode terminals extend from the top and bottom of the electrode element. The plurality of electrode terminals extending from the top of the electrode element are electrically connected to one end of a collecting terminal with a metallic grommet. The other end of the collecting terminal is connected to the back of the lid element, and thus the plurality of electrode terminals are electrically connected to the lid element through the grommet and the collecting terminal.

11 Claims, 10 Drawing Sheets

SECONDARY BATTERY WITH PLURAL ELECTRODE TERMINALS CONNECTED THROUGH ONE COLLECTING TERMINAL AND MANUFACTURING METHOD THEREOF

BACKGROUND OF THE INVENTION

1. Field of the Invention

The present invention relates to a secondary battery in which a plurality of electrode terminals extending from an end of an electrode sheet are connected to the back of a lid element through one collecting terminal, and a manufacturing method thereof.

2. Description of the Related Art

Electric cars or hybrid cars have been developed in consideration of environmental issues, and compact and lightweight secondary batteries with high performance are needed. Such secondary batteries include a lithium-ion battery, for example. The lithium-ion battery has a small size and a light weight, a large capacity, and good charging characteristics and good cycle characteristics.

Figure 1:
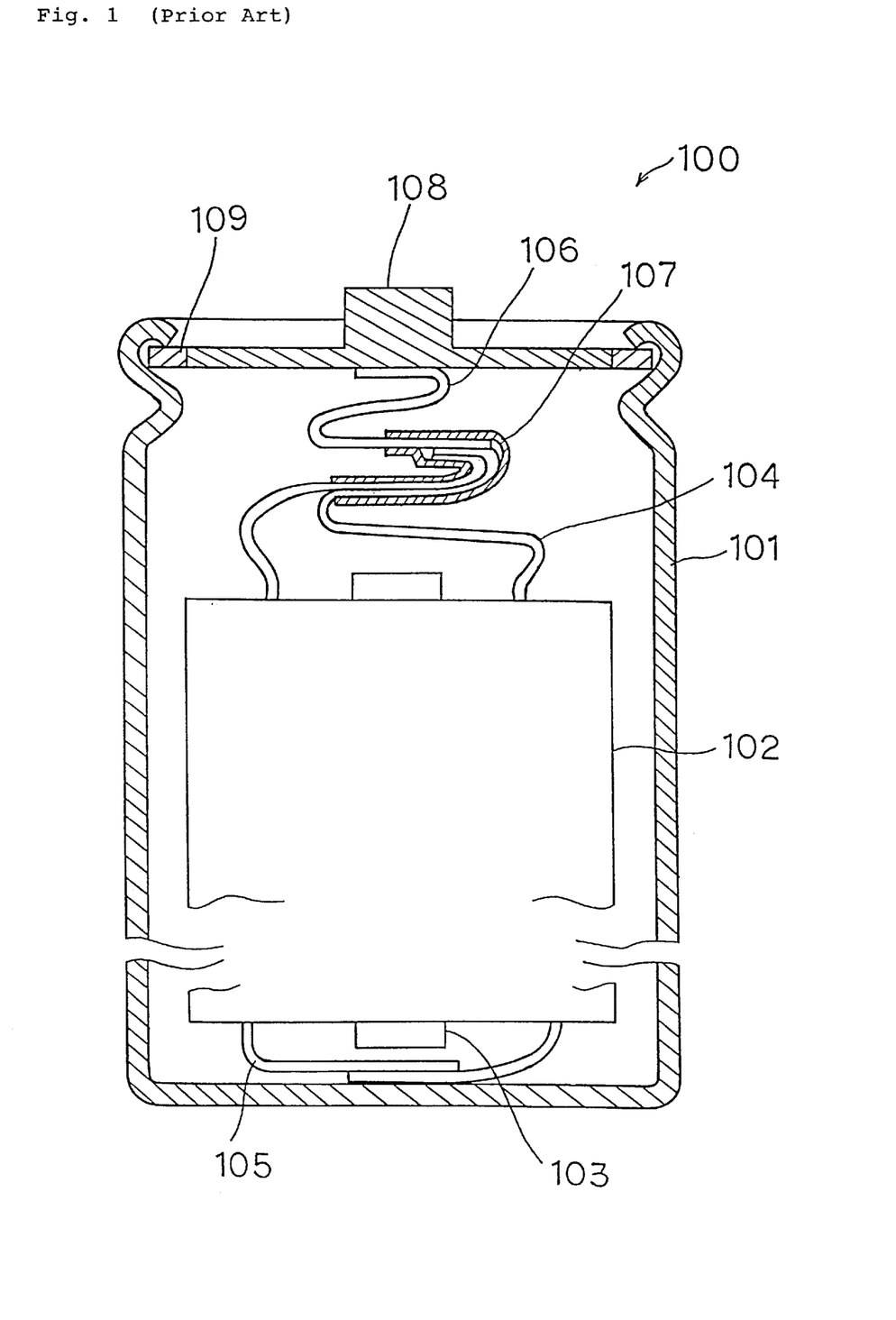
FIG. 1 is a vertical sectional view showing the inner structure of a conventional secondary battery.

A prior art of such a secondary battery is hereinafter described with reference to FIG. 1 and FIG. 2a to FIG. 2f. FIG. 1 is a vertical sectional view showing the inner structure of a conventional secondary battery, and FIG. 2a to FIG. 2f are diagrams for explaining a method of manufacturing the conventional secondary battery.

As shown in FIG. 1, secondary battery 100 herein illustrated comprises case 101 in which electrode element 102 is accommodated. Case 101 is shaped into a hollow cylinder with its bottom closed and its top opened, and is made of iron which is a conductive material.

Electronic element 102 comprises a positive pole sheet, a separator sheet, a negative pole sheet and hollow core 103, and is configured such that the positive pole sheet, the separator sheet and the negative pole sheet are laminated and wound around core 103 in cylindrical shape. A plurality of electrode terminals 104 and 105 are provided to protrude at a plurality of points on the upper edge of the positive pole sheet and on the lower edge of the negative pole sheet, respectively. Thus, these positive/negative electrode terminals 104 and 105 extend from a plurality of points on the top and the bottom of electrode element 102, respectively.

Positive pole electrode terminals 104 extending upward from the positive pole sheet are bound into one, and one collecting terminal 106 is welded to the upper end thereof. Insulating tape 107 is wound around the upper portion of electrode terminals 104 thus bound into one and the lower portion of collecting terminal 106. The upper end of collecting terminal 106 which is not wound in insulating tape 107 is welded to the back of lid element 108.

Lid element 108 is formed in disk shape with aluminium which is a conductive material, and is integrally provided at its outer edge with gasket 109 made of resin which is an insulating material. Since gasket 109 is fixed to the top end of case 101, the opening on the top of case 101 is closed by lid element 108 in an insulating state.

Negative pole electrode terminals 105 extending downward from the negative pole sheet are bent toward the center of electrode element 102. At the center, all electrode terminals 105 are disposed one on another and directly welded to the inner surface of case 101 on the bottom. In electrode element 102, the gaps between every sheet are impregnated with a nonaqueous electrolytic solution (not shown).

In secondary battery 100 as configured above, the positive pole sheet in electrode element 102 impregnated with the nonaqueous electrolytic solution produces a positive electric potential and the negative pole sheet produces a negative electric potential. Thus, lid element 108 on the top serves as a positive pole and the bottom of case 101 serves as a negative pole.

Figure 2A:
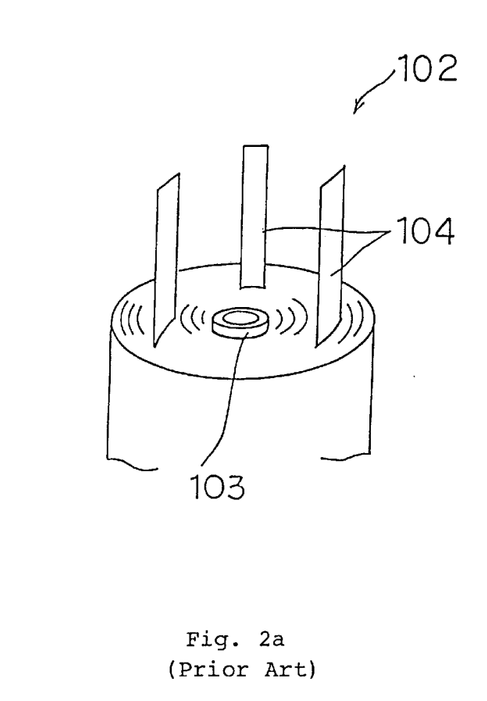
FIGS. 2a–2f are sectional views for explaining a method of manufacturing the secondary battery shown in FIG. 1.

Description is now made in brief for a method of manufacturing secondary battery 100 as configured above. The positive pole sheet connected with electrode terminals 104 at the plurality of points on the upper edge, the separator sheet, and the negative pole sheet connected with electrode terminals 105 at the plurality of points on the lower edge are laminated and wound around core 103 to form circular cylindrical electrode element 102 as shown in FIG. 2a.

Figure 2B:
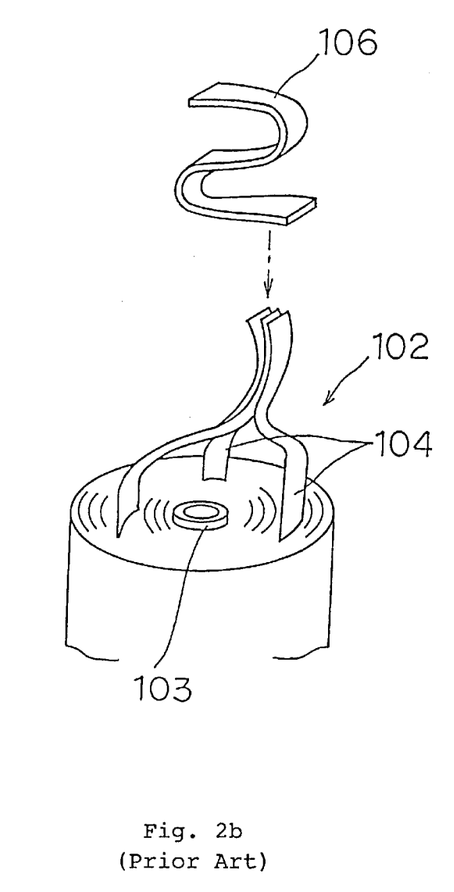
Figure 2C:
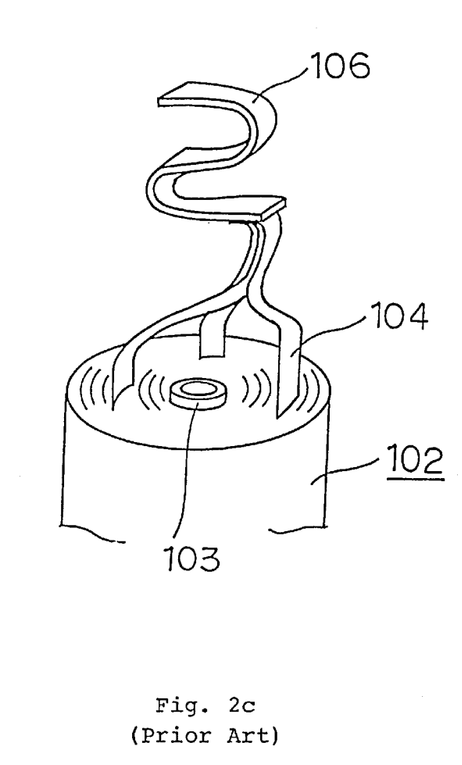

Next, as shown in FIG. 2b, positive pole electrode terminals 104 extending from the plural points on the upper edge of electrode element 102 are bound into one to which the lower end of one collecting terminal 106 is resistance welded as shown in FIG. 2c. It should be noted that while FIG. 1 shows two electrode terminals 104 and 105 and FIG. 2a to FIG. 2f show three for simplifying illustration, a number of electrode terminals 104 and 105 are actually used.

Figure 2D:
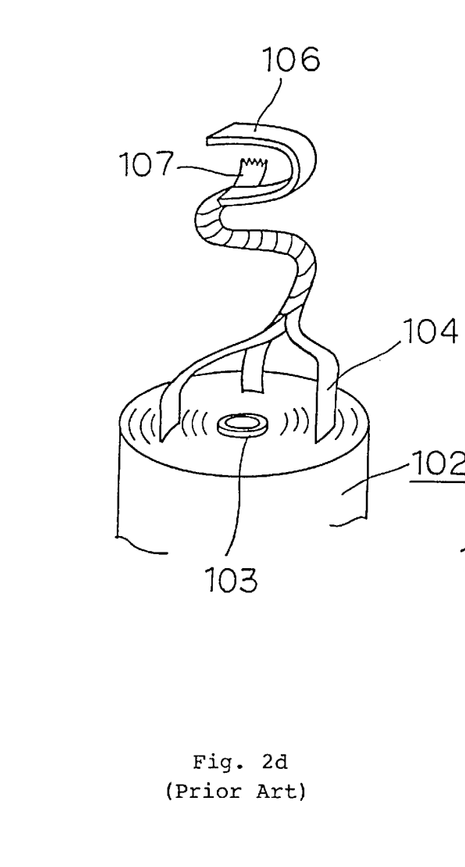
Figure 2E:
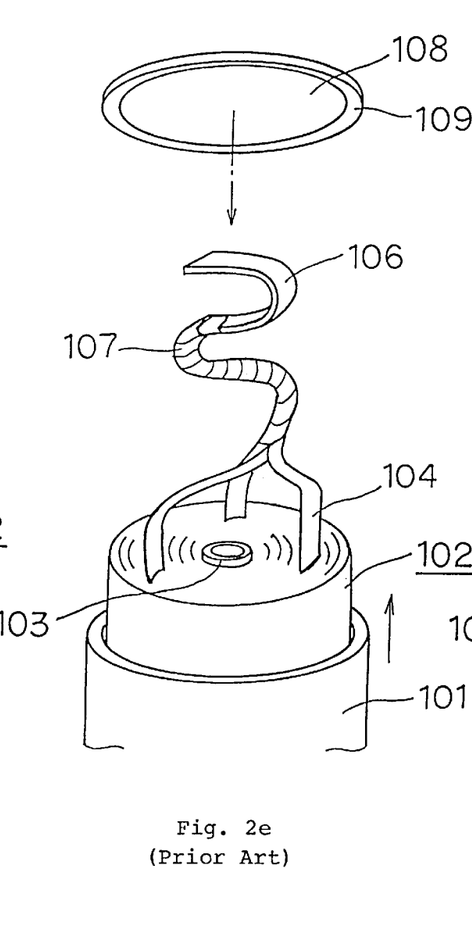

Next, as shown in FIG. 2d, insulating tape 107 is wound around the upper portion of electrode terminals 104 bound into one and the lower portion of collecting terminal 106. As shown in FIG. 2e, electrode element 102 for which the winding is completed is accommodated into case 101 from the opening on the top.

At this time, negative pole electrode terminals 105 extending from the bottom of electrode element 102 are bent toward the center and disposed one on another, and in this state, abutted against the bottom of case 101. A welding electrode (not shown) is inserted into a through hole in the center of core 103 to perform resistance welding of negative pole electrode terminals 105 disposed one on another on the bottom of case 101.

Figure 2F:
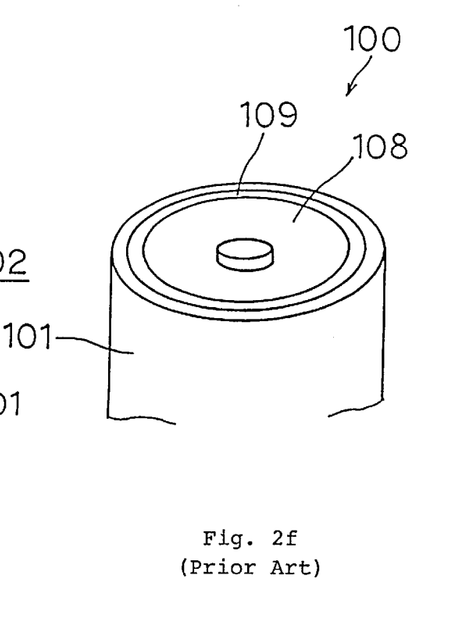

Next, the upper end of collecting terminal 106 which is not wound in insulating tape 107 is resistance welded to the back of lid element 108, and as shown in FIG. 2f, lid element 108 is fit and fixed to the opening on the top of case 101. The aforementioned method of manufacturing secondary battery 100 can be changed in the order of the steps as long as the contents cause no contradiction.

For example, it is possible that electrode element 102 is accommodated into case 101, and then, electrode terminals 104 are bound into one, collecting terminal 106 is welded thereto, and insulating tape 107 is wound around them. In addition, it is not impossible that the upper end of collecting terminal 106 is connected to the back of lid element 108 in advance and the lower end of collecting terminal 106 is welded to electrode terminal 104.

In secondary battery 100 as configured above, since positive pole electrode terminals 104 extending from the plurality of points on the top of electrode element 102 are connected to lid element 108 through one collecting terminal 106, lid element 108 can serve as an electrode. In particular, since lid element 108 is connected to collecting terminal 106 with low resistance which in turn is connected to positive electrode terminals 104, a large current can flow from electrode element 102 to lid element 108.

As described above, positive electrode terminals 104 extending from the plural points on the top of electrode element 102 wound in cylindrical shape are bound into one as shown in FIG. 2a. As a result, some of electrode terminals 104 are twisted at angles at which they are strained.

Thus, electrode terminals 104 may be broken. To avoid this, long electrode terminals 104 must be formed, which causes the difficulty of automatically binding electrode terminals 104 into one. In addition, since electrode terminals 104 bound into one is welded to one collecting terminal 106, the welding is complicated and thus a welder (not shown) therefor is required.

The formation of long electrode terminals 104 as mentioned above requires the winding of insulating tape 107 such that they cause no short circuit to the inner surface of case 101, but this task is complicated and automation is difficult. Furthermore, long electrode terminals 104 as mentioned above make it difficult to reduce the gap between the top of electrode element 102 and the bottom of lid element 108, thereby obstructing a smaller size and lighter weight of secondary battery 100.

Additionally, in secondary battery 100 as configured above, since electrode element 102 accommodated in case 101 cannot be fixed as it is, a dedicated spacer (not shown) is required, for example. This further hinders a smaller size and lighter weight and productivity.

SUMMARY OF THE INVENTION

It is an object of the present invention to provide a secondary battery with a simple structure, a small size and lightweight, and good productivity, and a method of manufacturing the same.

The secondary battery of the present invention comprises an electrode element, a case for accommodating the electrode element therein, and a conductive lid element for closing an opening of the case. A plurality of electrode terminals extends from an end of the electrode element. The plurality of electrode terminals is connected to a collecting terminal connected to the back of the lid element through a metallic grommet.

Thus, in the secondary battery of the present invention, since the plurality of electrode terminals extending from the electrode element are connected to the back of the lid element through the collecting terminal, the lid element serves as either a positive electrode or a negative electrode. The electrode terminals and the collecting terminal are connected through the metallic grommet to electrically connect them, thereby eliminating the need for binding the plurality of electrode terminals into one and the need for welding the electrode terminals to the collecting terminal.

According to a preferred embodiment of the secondary battery of the present invention, the case has both ends opened, and accordingly, lid elements, collecting terminals, and grommets are provided in pairs. In this case, since the plurality of electrode elements on both ends of the electrode element are connected to the paired lid elements through the paired collecting terminals, one of the lid elements serves as a positive electrode and the other serves as a negative electrode.

In the secondary battery as described above, preferably, the electrode element is formed in circular cylindrical shape, the case is formed in cylindrical shape, the lid element is formed in disk shape, and the grommet is formed in annular shape. In this case, since the electrode element is of circular cylindrical shape, one surface of each of the plurality of electrode terminals extending from the end of the electrode element faces the center of the electrode element. On the other hand, since the grommet is of annular shape, the electrode terminals are connected to the grommet from the perimeter of the grommet without being twisted at angles at which they are strained.

In this case, the grommet preferably includes a flange portion and a rounded portion formed by rounding outward a cylindrical portion connected to the flange portion and having an opening hole in the center.

When such a grommet is used, one end of each of the electrode terminals is rounded outward together with the rounded portion for connection to the grommet. On the other hand, one end of the collecting terminal extends sequentially through the opening hole and along the back, outer edge, and front of the flange portion and is rounded outward together with the rounded portion for connection to the grommet. Thus, the electrode terminals and the collecting terminal are connected together to the grommet at the rounded portion and electrically connected.

According to a preferred embodiment of the present invention, the secondary battery includes a conductive ring that is electrically connected to the electrode terminals and the collecting terminal and is fixed to the grommet for improving the conductivity of the electrode terminals and the collecting terminal. In addition, according to a preferred embodiment of the present invention, the secondary battery includes an insulating ring, if the case is made from a conductive material and insulated from the lid element. The insulating ring is fixed to the grommet and has at least part of the perimetric edge abutting against the inner surface of the case. With this configuration, since the case made from a conductive material is insulated from the lid element, the lid element serves as an electrode that is not electrically connected to the case. In addition, the collecting terminal and the electrode terminals are not in contact with the inner surface of the case, which eliminates the need for winding an insulating tape around the collecting terminal and the electrode terminals. Furthermore, since the insulating ring holds the electrode element with respect to the case, no dedicated member is required for the holding.

A method of manufacturing a secondary battery of the present invention comprises the steps of: forming an electrode element provided with a plurality of electrode terminals protruding from both ends of the electrode element; connecting the plurality of electrode with one end of a collecting terminal using a metallic grommet at least one end of the electrode element; accommodating the electrode element into a case with at least one open end; electrically connecting the collecting terminal to the back of a conductive lid element; and closing the open end of the case with the lid element.

Thus, according to the present invention, the collecting terminal and the plurality of electrode terminals are connected together with the metallic grommet, thereby eliminating the need for binding the plurality of electrode terminals into one and the need for welding the electrode terminals to the collecting terminal.

According to a preferred embodiment of the method of manufacturing a secondary battery of the present invention, the step of connecting the plurality of electrode terminals with the collecting terminal includes the steps of preparing the grommet having a cylindrical portion and a flange portion integrally provided at one end of the cylindrical portion. First, one end of each of the plurality of electrode terminals and one end of the collecting terminal are extended from the outside to the center in the radial direction of the grommet on the flange portion and disposed at the outer surface of the cylindrical portion. Next, the other end of the cylindrical portion is rounded outward together with the ends of the electrode terminals and the end of the collecting terminal to form an annular rounded portion. Then, the other end of the collecting terminal is inserted into an opening hole in the center of the rounded portion from the opposite side to that of the flange portion of the grommet provided with the rounded portion and passed through the opening hole.

According to the aforementioned manufacturing method, the electrode terminals and the collecting terminal are connected to the grommet at the rounded portion and are electrically connected. Since the electrode terminals extend on the flange portion from the outside to the center of the flange portion and are connected at the rounded portion, the electrode terminals are not twisted at angles at which they are strained.

A preferred embodiment of the method of manufacturing a secondary battery of the present invention further comprises the step of fitting a conductive ring to the cylindrical portion after the step of disposing one end of each of the electrode terminals and one end of the collecting terminal at the outer surface of the cylindrical portion. The rounded portion is formed after the fitting step to electrically connect the electrode terminals to the collecting terminal through the conductive ring. Thus, the conductivity of the electrode terminals and the collecting terminals is improved.

In addition, in a preferred embodiment of the method of manufacturing a secondary battery of the present invention, the case is formed from a conductive material. On this occasion, the step of connecting the electrode terminals to the collecting terminal through the grommet includes fixing an insulating ring to the grommet. The insulating ring being shaped to have at least part of its perimeter abutting against the inner surface of the case when the electrode element is accommodated in the case. And the step of closing the open end of the case with the lid element includes insulating the case from the lid element. According to the method, the lid element serves as an electrode that is not electrically connected to the case. In addition, since the insulating ring is fixed to the grommet, the collecting terminal and the electrode terminals are not in contact with the inner surface of the case, thereby eliminating the need for winding an insulating tape around the collecting terminal and the electrode terminals.

The above and other objects, features and advantages of the present invention will become apparent from the following description with reference to the accompanying drawings which illustrate examples of the present invention.

DESCRIPTION OF THE PREFERRED EMBODIMENTS

An embodiment of the present invention is hereinafter described with reference to FIG. 3, FIGS. 4a–4f, and FIGS. 5a–5g. In this embodiment, the parts identical to those of the aforementioned prior art are designated the same names and detailed description thereof is omitted. While the upper and lower directions in the following description are based on the position shown in FIG. 3, the directions are specified for the sake of convenience to simplify description and do not limit the directions of the apparatus when it is actually manufactured or used.

Figure 3:
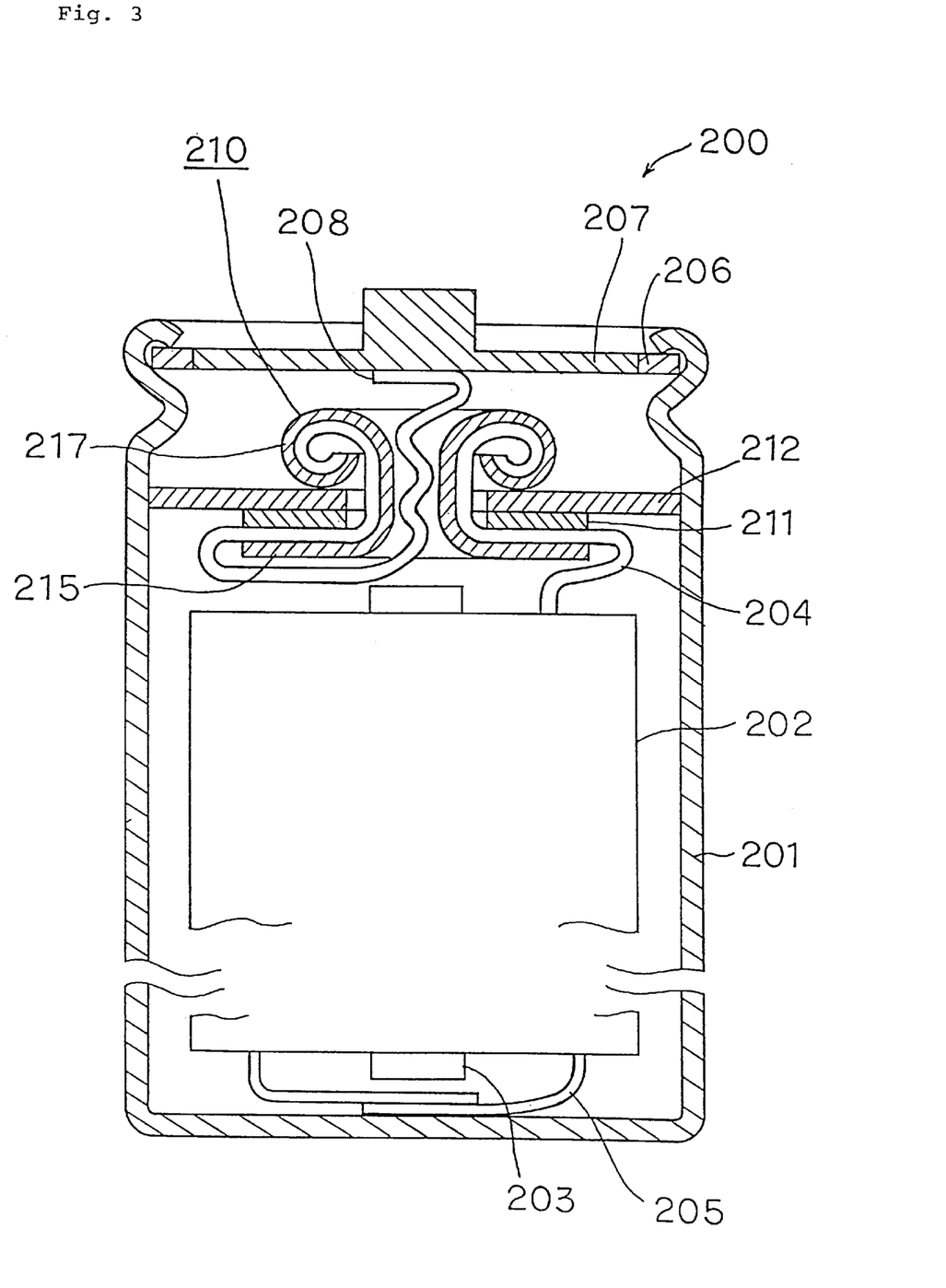
FIG. 3 is a vertical sectional view showing the internal structure of a secondary battery of one embodiment of the present invention.

Referring to FIG. 3, there is shown secondary battery 200 which comprises cylindrical case 201 made of iron with its top opened in which circular cylindrical electrode element 202 is accommodated, similarly to the secondary battery described above as one prior art.

Electrode element 202 is configured to include a positive pole sheet, a separator sheet and a negative pole sheet, all of which being laminated and wound around core 203. Electrode element 202 is provided with a plurality of positive pole electrode terminals 204 extending from a plurality of points on the top and a plurality of negative pole electrode terminals 205 extending from a plurality of points on the bottom.

Negative pole electrode terminals 205 are bent toward the center of electrode element 202, and welded to the bottom of case 201 at the position where all electrode terminals 205 are disposed one on another. Lid element 207 made of aluminium is fixed to the opening on the top of case 201 through gasket 206 made from resin. Collecting terminal 208 is welded to the back of lid element 207.

The aforementioned configuration is the same as that of the conventional secondary battery 100 described above (see FIG. 1), but secondary battery 200 of the present embodiment differs from secondary battery 100 in the following points. Specifically, collecting terminal 208 and positive pole electrode terminals 204 are connected together by grommet 210 made of aluminium, and conductive ring 211 and insulating ring 212 are also fixed to grommet 210.

Figures 4A, 4B:
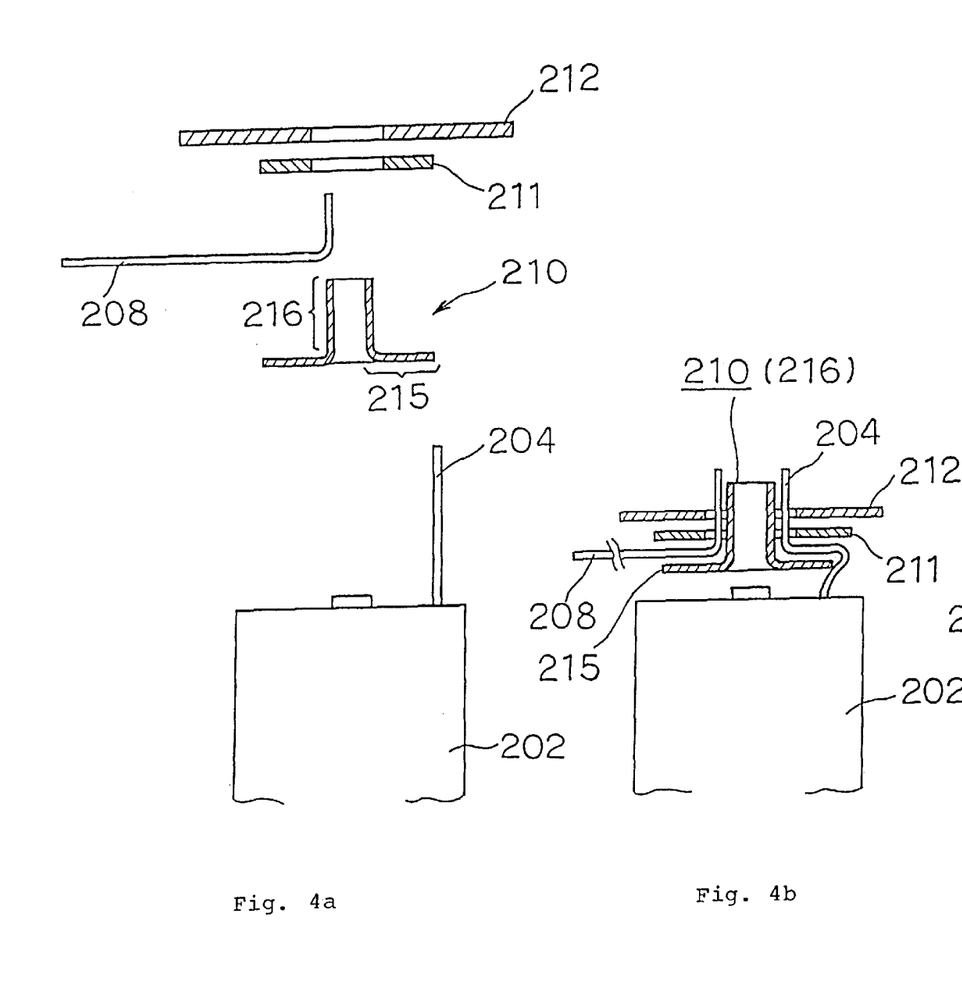
FIGS. 4a–4f are sectional views for explaining the manufacturing procedures of the secondary battery shown in FIG. 3.
Figure 4C:
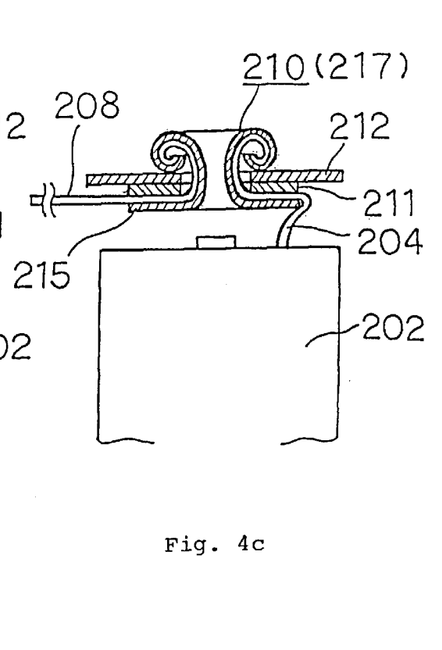

More specifically, grommet 210 includes cylindrical portion 216 and a disc portion (flange portion) 215 integrally formed with cylindrical portion 216 at the lower end thereof as shown in FIG. 4a. As shown in FIG. 3 and FIG. 4c, cylindrical portion 216 is rounded outward to form annular rounded portion 217.

Positive pole electrode terminals 204 extending from the top of electrode element 202 are bent along the surface of grommet 210 in the radial direction from the outside toward the center of disk portion 215 of grommet 210. The upper ends of positive pole electrode terminals 204 are rounded together with rounded portion 217. For simplifying illustration, FIG. 3 and FIGS. 4a–4f show one electrode terminal 204 and FIGS. 5a–5f show three electrode terminals 204, but many electrode terminals 204 are actually used.

Collecting terminal 208 has an end serving as a lower end which is rounded together with rounded portion 217 of grommet 210 and then is bent along the upper surface, outer edge and lower surface of disk portion 215 in this order. Collecting terminal 208 is drawn from the lower surface of disk portion 215 above rounded portion 217 through an opening hole in the center. The upper end of collecting terminal 208 exposing above the opening hole of rounded portion 217 is welded to the back of lid element 207.

Conductive ring 211 is made of aluminium which is a conductive material in substantially the same shape as that of disk portion 215 of grommet 210. Conductive ring 211 presses electrode terminal 204 and collecting terminal 208 on the upper surface of disk portion 215 of grommet 210 from above with the spring force of rounded portion 217.

Insulating ring 212 is formed from resin which is an insulating material and is sandwiched and fixed between rounded portion 217 of grommet 210 and conductive ring 211 with the spring force of rounded portion 217. Insulating ring 212 is formed in disk shape of sufficiently larger diameter than disk portion 215 of grommet 210 and conductive ring 211, and its perimeter abuts against the inner surface of case 201.

In secondary battery 200 of the embodiment configured as described above, similarly to the conventional secondary battery 100, the positive pole sheet and the negative pole sheet in electrode element 202, which are impregnated with a nonaqueous electrolytic solution produce positive/negative electric potentials, respectively. Thus, lid element 207 on the top serves as a positive pole and the bottom of case 201 serves as a negative pole.

Description is hereinafter made in brief for a method of manufacturing secondary battery 200 of the embodiment.

Figure 5A:
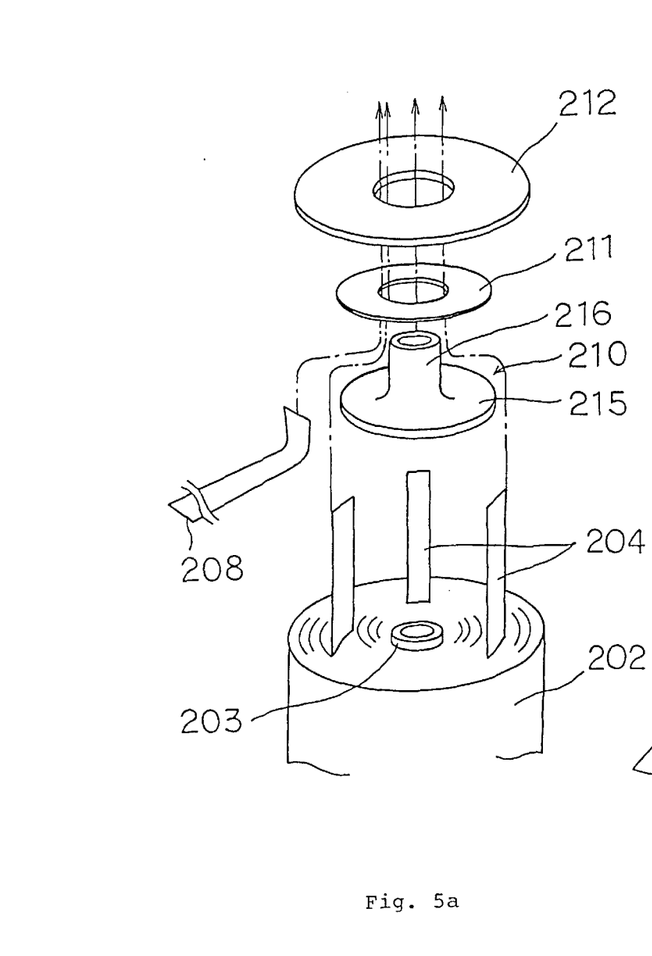
FIGS. 5a–5f are perspective views for explaining the manufacturing procedures of the secondary battery shown in FIG. 3.

First, the positive sheet connected with electrode terminals 204 at the plurality of points on the upper edge, the separator sheet, and the negative sheet connected with electrode terminals 205 at the plurality of points on the lower edge are laminated. Laminated sheets are wound around core 203 to form circular cylindrical electrode element 202 as shown in FIGS. 4a and 5a.

Next, one collecting terminal 208, grommet 210 made of aluminium including cylindrical portion 216 vertically provided at the center of the surface of disk portion 215, conductive ring 211 made of aluminium and formed in substantially the same shape as that of disk portion 215 of grommet 210, and insulating ring 212 made from resin of large diameter with its perimeter abutting against the inner surface of case 201 are prepared.

Figure 5B:
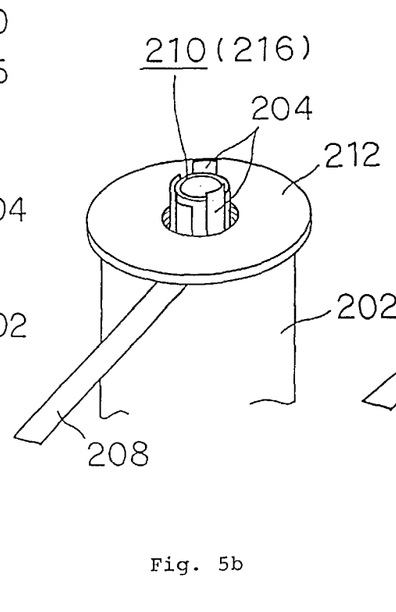

As shown in FIGS. 4b and 5b, one end of each electrode terminal 204 and one end of collecting terminal 208 are extended from the outside to the center of grommet 210 on the upper surface of disk portion 215 and then along cylindrical portion 216, and are disposed at the perimetric surface of cylindrical portion 216. In this state, conductive ring 211 and insulating ring 212 are sequentially fitted to cylindrical portion 216. Thus, electrode terminals 204 and collecting terminal 208 are located between conductive ring 211 and disk portion 215 of grommet 210.

Figure 5C:
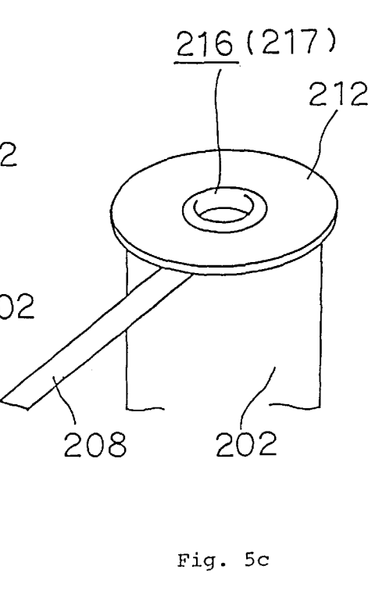

Next, cylindrical portion 216 of grommet 210 is rounded outward together with electrode terminals 204 and collecting terminal 208 to form annular rounded portion 217 for fixing electrode terminals 204 and collecting terminal 208 to grommet 210 as shown in FIGS. 4c and 5c. Since rounded portion 217 presses electrode terminals 204 and collecting terminal 208 through insulating ring 212 and conductive ring 211, conductive ring 211 is electrically connected to electrode terminals 204 and collecting terminal 208.

Figure 4D:
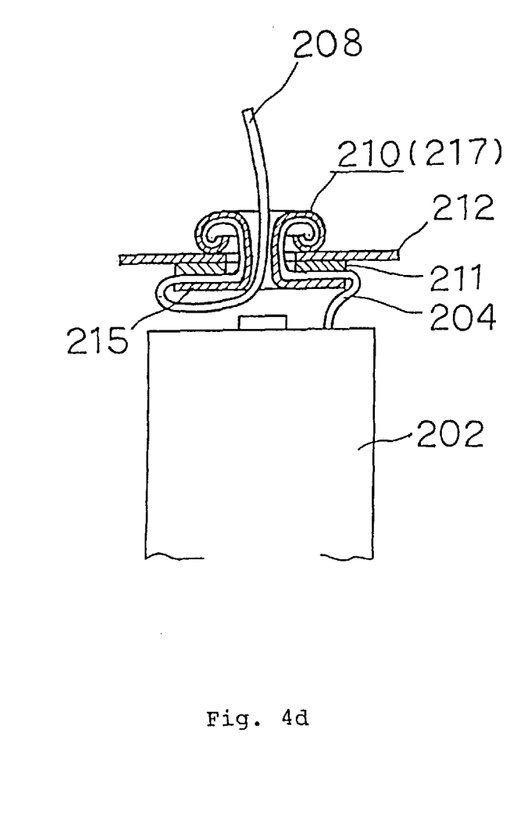
Figure 5D:
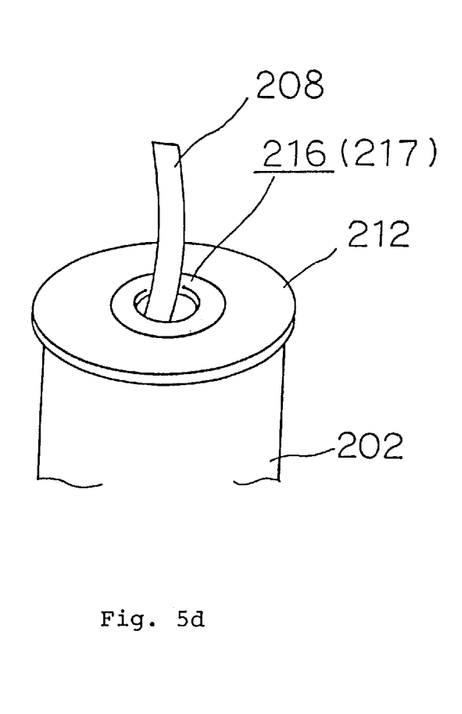

In this state, the other end of collecting terminal 208 extends outside grommet 210 from between disk portion 215 of grommet 210 and conductive ring 211. As shown in FIGS. 4d and 5d, the extending other end of collecting terminal 208 is bent to the back of disk portion 215 toward the center of grommet 210, and protruded above grommet 210 through the opening hole in the center of rounded portion 217.

Figure 4E:
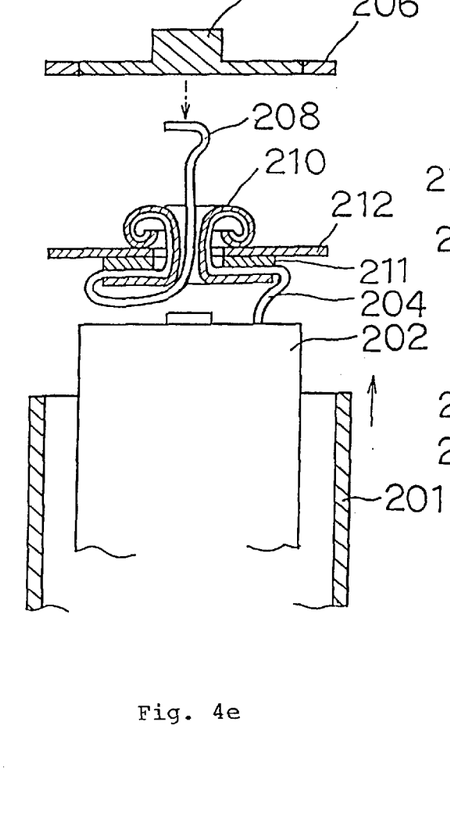
Figure 5E:
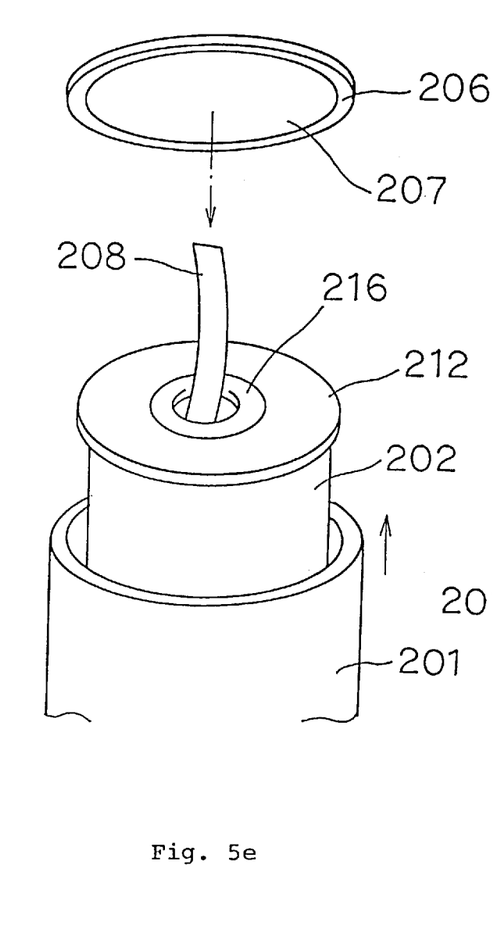

Next, as shown in FIGS. 4e and 5e, electrode element 202 in this state is accommodated into case 201 from the opening on the top, and the perimeter of insulating ring 212 is abutted against the inner surface of case 201.

Negative pole electrode terminals 205 extending from the bottom of electrode element 202 are bent toward the center of electrode element 202, and electrode terminals 205 are abutted against the bottom of case 201 at the position where they are disposed one on another. In this state, a welding electrode (not shown) is inserted into a through hole in the center of core 203 from the opening hole in the center of grommet 201 to perform resistance welding of negative pole electrode terminals 205 disposed one on another to the bottom of case 201.

Figure 4F:
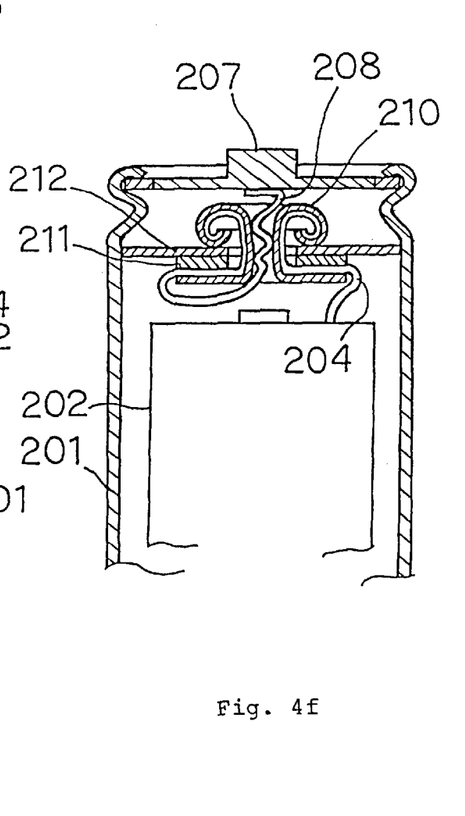
Figure 5F:
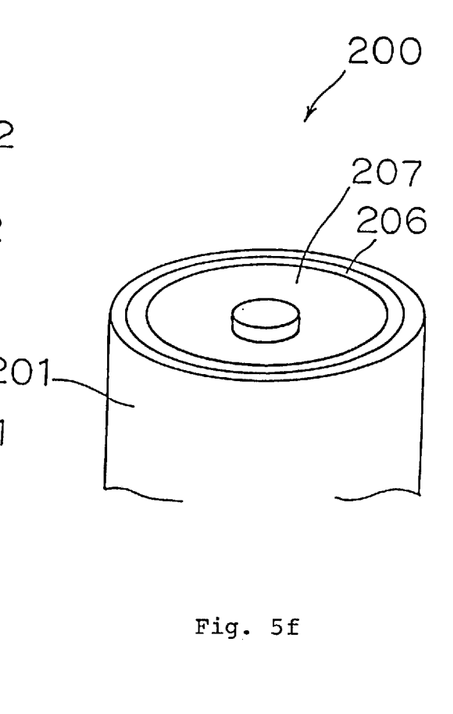

Next, the upper end of collecting terminal 208 drawn upward from the opening hole of grommet 201 is resistance welded to the back of lid element 207. Lid element 207 is fixed to the opening on the top of case 201, thereby completing secondary battery 200 of the embodiment as shown in FIGS. 4f and 5f.

In secondary battery 200 of the embodiment, similarly to the conventional secondary battery 100, electrode terminals 204 extending from cylindrical electrode element 202 at the plurality of points on the upper edge each have one surface facing the center of electrode element 202. In secondary battery 200 of the embodiment, however, metallic grommet 201 connects together electrode terminals 204 extending from electrode element 202 at the plurality of points and one collecting terminal 208, unlike the conventional secondary battery 100.

Since grommet 210 is of annular shape, electrode terminals 204 are connected to grommet 210 from the perimeter without being twisted at angles at which they are strained. Thus, electrode terminals 204 need not be twisted at angles at which they are strained for binding into one, and breakage of electrode terminals 204 due to such twist can be prevented.

In this manner, since secondary battery 200 of the embodiment has no need for twisting electrode terminals 204 to bind them into one, electrode terminals 204 can be shorter than those in the prior art. As a result, the gap between the top of electrode element 202 and the bottom of lid element 207 can be reduced to achieve a smaller size and lighter weight of the entire battery. In addition, no need for welding of electrode terminals 204 to collecting terminal 208 simplifies the connecting structure and connecting operation for electrode terminal 204 and collecting terminal 208.

Additionally, since conductive ring 211 fixed by grommet 210 is electrically connected to electrode terminals 204 and collecting terminal 208, the conductivity of electrode terminals 204 and collecting terminal 208 is improved by conductive ring 211, thereby allowing secondary battery 200 of the embodiment to produce a large current.

Moreover, the perimeter of insulating ring 212 fixed to grommet 210 abuts against the inner surface of case 201, which prevents collecting terminal 208 and electrode terminals 204 from contacting the inner surface of case 201. For this reason, an insulating tape need not be wound around collecting terminal 208 and electrode terminals 204, resulting in improved productivity of secondary battery 200.

Insulating ring 212 which prevents collecting terminal 208 and electrode terminals 204 from being short-circuited to case 201 in this manner holds grommet 210 in a direction orthogonal to the axis of case 201. Thus, the top of electrode element 202 can be held inside case 201 without requiring dedicate members.

Figure 6:
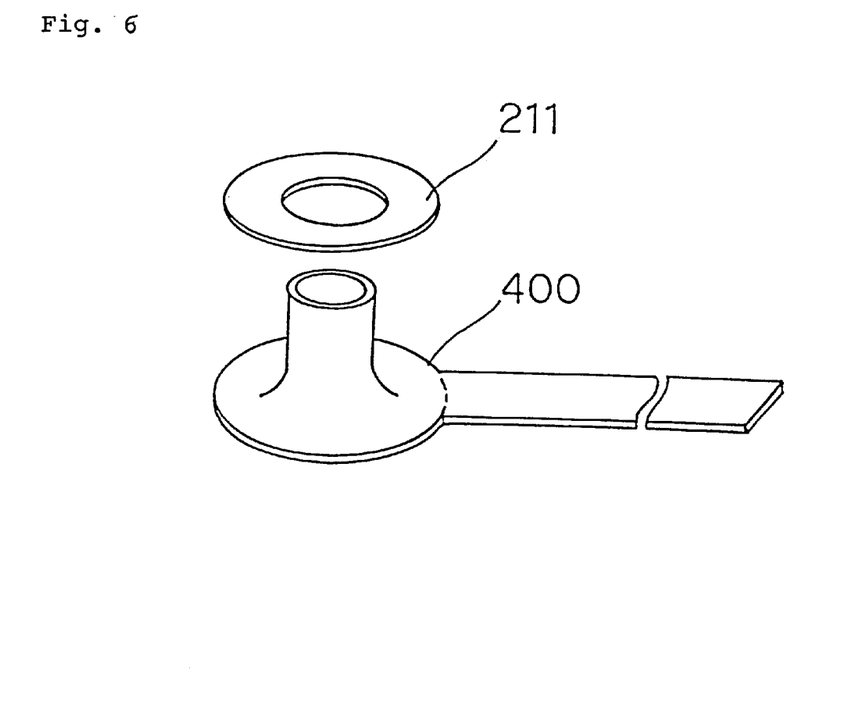
FIG. 6 is a perspective view showing a variation of a grommet applicable to the present invention.

It should be noted that the present invention is not limited to the aforementioned embodiment, and various changes are allowed without departing from the main points. For example, while the aforementioned embodiment illustrates collecting terminal 208 and grommet 210 as separate parts, grommet 400 integrated with a collecting terminal can be used as shown in FIG. 6.

In this case, no need for separately providing collecting terminal 208 and grommet 210 and no need for connecting collecting terminal 208 with grommet 210 facilitate the assembly of the secondary battery. When collecting terminal 208 and grommet 210 are provided as separate parts, productivity is good at the parts. When grommet 400 integrated with a collecting terminal is used, the assembly of the secondary battery is facilitated. Thus, it is preferably that selection is appropriately made from them in consideration of various conditions.

Figure 7:
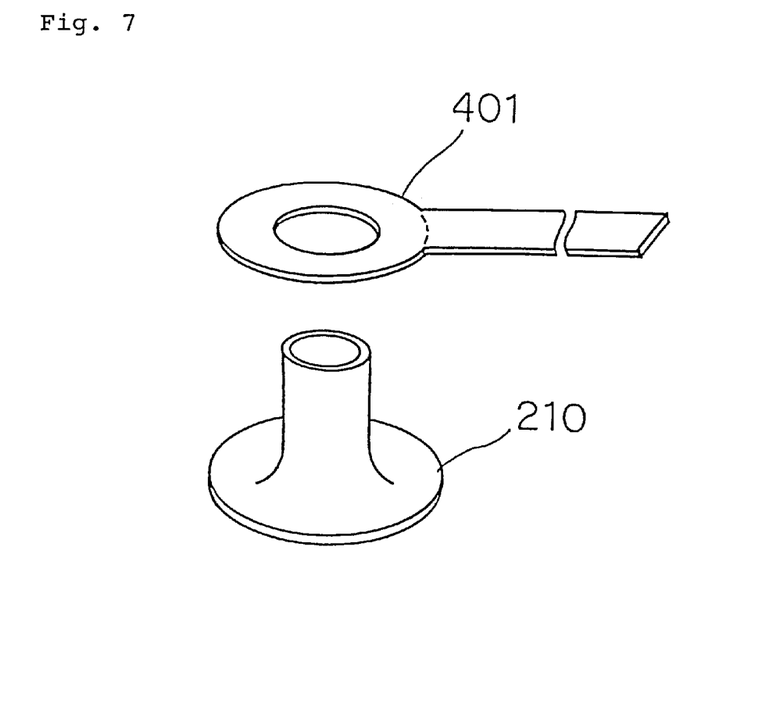
FIG. 7 is a perspective view showing a variation of a conductive ring applicable to the present invention.

Similarly, as shown in FIG. 7, conductive ring 401 integrated with a collecting terminal can be used. In this case, no need for separately providing collecting terminal 208 and conductive ring 211 and no need for abutting collecting terminal 208 against conductive ring 211 for conduction facilitate the assembly of the secondary battery. In addition, insulating ring 212 and conductive ring 211 can be integrally formed to facilitate the assembly of the secondary battery.

The aforementioned embodiment illustrates secondary battery 200 configured such that lid element 207 made of aluminium is fit to case 201 made of iron and lid element 207 serves as a positive pole. However, a secondary battery (not shown) may be implemented in a configuration such that a lid element made of iron is fixed to a case made of aluminium and a lid element serves as a negative pole. In this case, the structures of parts such as a grommet may be the same as those of secondary batter 200 shown in FIG. 3 and the like, but the materials of the grommet and a collecting terminal are preferably nickel or the like.

Figure 8:
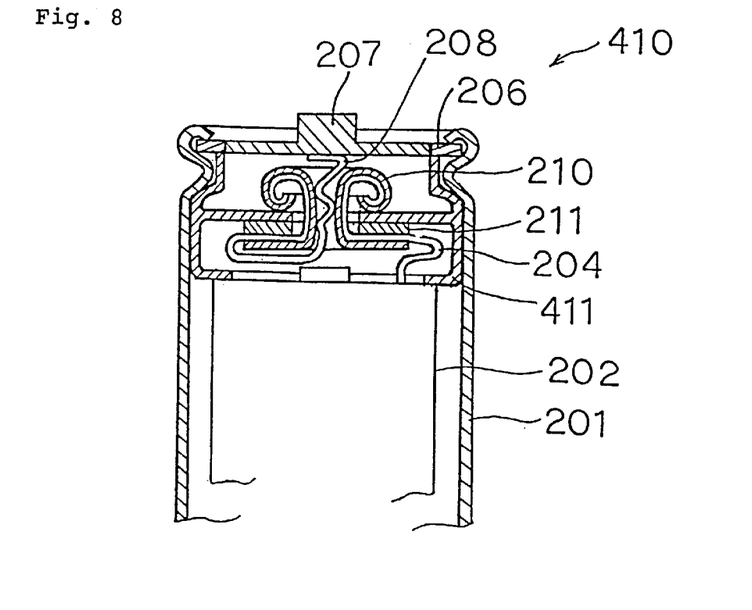
FIG. 8 is a vertical sectional view showing a variation of the secondary battery of the present invention.

The aforementioned embodiment illustrates that insulating ring 202 which prevents collecting terminal 208 and electrode terminals 204 from being short-circuited to case 201 holds the top of electrode element 202 in a direction orthogonal to the axis with respect to case 201. It is possible, however, as secondary battery 410 shown in FIG. 8. In FIG. 8, insulating ring 411 is formed in such a shape as to abut against the inner surface of projections and depressions of case 201, the lower surface of lid element 207 and the upper surface of electrode element 202. By this configuration, the entire electrode element 202 can be held in the axis direction with respect to case 201.

The aforementioned embodiment illustrates secondary battery 200 in which one lid element 207 is fit to case 201 with only one end opened. However, the secondary battery may be configured such that paired lid elements 207, 422 are fit to both ends of case 421 with both ends opened as secondary battery 420 shown in FIG. 9.

Figure 9:
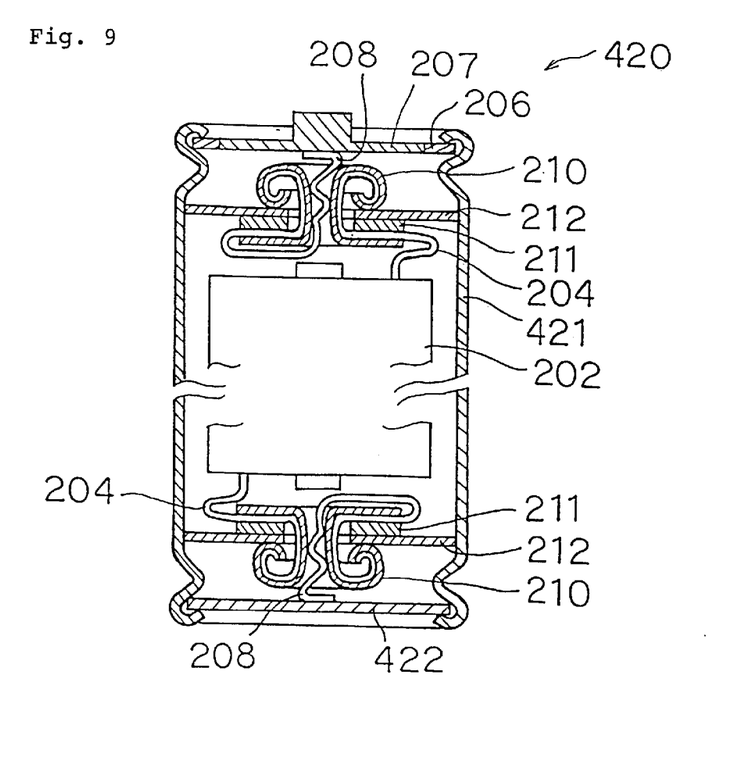
FIG. 9 is a vertical sectional view showing another variation of the secondary battery of the present invention.

In secondary battery 420, gasket 109 may be omitted in one lid element 422, and insulating ring 212 may be omitted at the position of grommet 210 connected to lid element 422. In this case, however, insulating ring 212 is preferably not omitted as a member for holding the position of electrode element 202. Additionally, the provision of insulating ring 212 on the side of lid element 422 allows the same structure on both sides of electrode element 202, thereby obtaining improved productivity of secondary battery 420.

In secondary battery 420 as described above, for example, if case 421 is formed from an insulating material such as resin, gaskets 109 can be omitted in both lid element 207 and lid element 422 on both sides, and insulating rings 212 can be omitted at the positions of grommets 210 on both sides.

While preferred embodiments of the present invention have been described using specific terms, such description is for illustrative purposes only, and it is to be understood that changes and variations may be made without departing from the spirit or scope of the following claims.

What is claimed is:

1. A secondary battery comprising:
   an electrode element formed by winding a laminate of a positive pole sheet, a separator sheet and a negative pole sheet, and impregnated with a nonaqueous electrolytic solution;
   a case having at least one open end for accommodating said electrode element therein;
   a conductive lid element for closing the open end of said case;
   an elongated narrow collecting terminal connected to the back of said lid element;
   a plurality of electrode terminals extending from a plurality of points on at least one end of each of said positive pole sheet and said negative pole sheet; and
   a metallic grommet for connecting together said collecting terminal with said plurality of electrode terminals, wherein said grommet is formed in an annular shape having an opening hole in its center, and said collecting terminal extends through said opening hole in said grommet.

2. The secondary battery according to claim 1, wherein said case has two open ends,
   the open ends of said case are individually closed by paired said lid elements,
   the backs of said paired lid elements are individually connected to paired collecting terminals,
   said plurality of electrode terminals extending from said positive pole sheet are located on one end of said electrode element, and said plurality of electrode terminals extending from said negative pole sheet are located on the other end of said electrode element, and
   each of paired said grommets connects each of said paired collecting terminals with said electrode terminals on each end of said electrode element.

3. The secondary battery according to claim 1, wherein said electrode element is formed in circular cylindrical shape,
   said case is formed in cylindrical shape, and
   said lid element is formed in disk shape.

4. The secondary battery according to claim 1, wherein said grommet includes a flange portion and a rounded portion which is rounded outwardly a cylindrical portion integrally formed with said flange portion and having said opening hole in the center,
   said electrode terminal has one end which is rounded outward together with said rounded portion for connection to said grommet, and
   said collecting terminal has one end which extends sequentially through said opening hole and along the back, outer edge, and front of said flange portion and is rounded outward together with said rounded portion for connection to said grommet.

5. The secondary battery according to claim 1, further comprising a conductive ring fixed to said grommet and electrically connected to said electrode terminals and said collecting terminal.

6. The secondary battery according to claim 5, wherein said collecting terminal and said conductive ring are integrally formed.

7. The secondary battery according to claim 1, wherein said collecting terminal and said grommet are integrally formed.

8. The secondary battery according to claim 1, wherein said case is made of a conductive material, insulated from said lid element, and further provided with an insulating ring fixed to said grommet, at least the part of the outer edge of said insulating ring being abutted against the inner surface of said case.

9. A method of manufacturing a secondary battery, comprising the steps of:

forming an electrode element by winding a laminate of a positive pole sheet, a separator sheet and a negative pole sheet, said electrode element having one end from which a plurality of electrode terminals electrically connected to said positive pole sheet protrude and the other end from which a plurality of electrode terminals electrically connected to said negative pole sheet protrude;

connecting at least one of said electrode terminals electrically connected to said positive pole sheet and said electrode terminals electrically connected to said negative pole sheet with one end of a collecting terminal using a metallic grommet;

accommodating said electrode element into a case having at least one open end;

electrically connecting the other end of said collecting terminal to the back of a conductive lid element; and closing the open end of said case with said lid element, wherein said step of connecting said electrode terminals with said collecting terminal includes the steps of:

preparing said grommet including a cylindrical portion and a flange portion integrally provided at one end of said cylindrical portion;

extending one end of each of said electrode terminals and one end of said collecting terminal from the outside to the center in the radial direction of said grommet on said flange portion and disposing said ends at the outer surface of said cylindrical portion;

rounding the other end of said cylindrical portion outward together with said ends of said electrode terminals and said end of said collecting terminal to form an annular rounded portion; and inserting the other end of said collecting terminal into an opening hole in the center of said rounded portion from the opposite side to that of said flange portion of said grommet provided with said rounded portion and passing said other end of said collecting terminal through said opening hole.

10. The method of manufacturing a secondary battery according to claim 9, further comprising the step of fitting a conductive ring to said cylindrical portion after disposing one end of each of said electrode terminals and one end of said collecting terminal at the outer surface of said cylindrical portion, and wherein said rounded portion is formed after said fitting step to electrically connect said electrode terminals to said collecting terminal through said conductive ring.

11. A method of manufacturing a secondary battery, comprising the steps of:

forming an electrode element by winding a laminate of a positive pole sheet, a separator sheet and a negative pole sheet, said electrode element having one end from which a plurality of electrode terminals electrically connected to said positive pole sheet protrude and the other end from which a plurality of electrode terminals electrically connected to said negative pole sheet protrude;

connecting at least one of said electrode terminals electrically connected to said positive pole sheet and said electrode terminals electrically connected to said negative pole sheet with one end of a collecting terminal using a metallic grommet having an annular shape and including an opening hole which extends therethrough, by extending said collecting terminal through said hole;

accommodating said electrode element into a case having at least one open end; electrically connecting the other end of said collecting terminal to the back of a conductive lid element; and closing the open end of said case with said lid element, wherein said case is formed of a conductive material, wherein said step of connecting said electrode terminals to said collecting terminal through said grommet includes fixing an insulating ring to said grommet, said insulating ring being shaped to have at least part of its perimeter abutting against the inner surface of said case when said electrode element is accommodated in said case, and said step of closing the open end of said case with said lid element includes insulating said case from said lid element.

\* \* \* \* \*